Patented July 17, 1951

2,561,011

UNITED STATES PATENT OFFICE 2,561,011

NONFOGGING RUBBER HYDROCHLORIDE FILM AND METHOD OF MAKING IT

Clarence M. Carson, Cuyahoga Falls, Ohio, assignor to Wingfoot Corporation, Akron, Ohio, a corporation of Delaware No Drawing. Application July 13, 1949,
Serial No. 104,595

6 Claims. (Cl. 260—735)

This invention relates to non-fogging rubber hydrochloride film.

Rubber hydrochloride film is hydrophobic in nature. Water condensing on its surface forms droplets which befog the film. Attempts to coat the film with a hydrophilic material have not met with commercial success. Hydrophilic materials which are preferred for this use are soluble in the rubber hydrochloride cement from which the film is cast, but only slightly soluble in the film after evaporation of the solvent, so that when added to the film in excess of the amount soluble in the film, they are thrown out of solution when the solvent is evaporated and form a thin coating on the surface of the film.

The materials best suited for this purpose are polyethylene glycol esters of aliphatic acids having twelve to twenty carbon atoms in the chain. These include, for example, the di-, and tri-, etc. glycol esters of oleic acid, lauric acid, stearic acid, etc. These esters may be formed by reaction of the glycol in solution with the acid, using a suitable catalyst. For instance, one mole of triethylene glycol is reacted in toluol solution with two moles of oleic acid, using p-toluene sulfonic acid as a catalyst. One-half per cent of the catalyst (based on the weight of the reactants before the reaction) is satisfactory. During refluxing for two hours or thereabouts water is removed from the vapor condensate by means of a trap. The toluene is thereafter removed by vacuum distillation. The product should have an acid number of approximately zero if all the fatty acid is reacted. This invention relates to the use of the full esters and not the half esters.

Rubber hydrochloride is a hydrophilic material and when used as a bag for packaging lettuce, celery, radishes, etc., moisture from the produce condenses on the inner surface of the film in the form of tiny droplets forming a dense opaque layer on the inner surface of the film. Water condenses on film coated with the ester in a thin continuous layer instead of in the form of droplets and in this form does not interfere with the visibility of the contents of the package. Certain surface-active hydrophilic materials, when added to the film, increase the water absorption of the film to the point where it becomes opaque. The esters of this invention do not increase the water absorptivity of the film sufficiently to cause the film to become opaque under normal conditions of use. For example, non-fogging film of this invention immersed in distilled water at 70 to 80° F. for 24 hours does not absorb as much as three per cent by weight of the water and this is not enough the interfere with the clear transparency of the film.

The following are illustrative of esters which may be used as anti-fogging agents:

Triethylene glycol dioleate.
Tetraethylene glycol dioleate.
Polyethylene glycol mono-oleate (400 molecular weight).
Polyethylene glycol dilaurate (1500 molecular weight).
Polyethylene glycol monostearate (4000 molecular weight).

These compounds vary from a liquid to a hard wax.

The foregoing list is illustrative only since all of the full esters coming within the foregoing definition are suitable for compounding with rubber hydrochloride to produce the non-fogging effect.

By incorporating the ester in a solution of rubber hydrochloride in an organic solvent, casting the solution as a film and then evaporating the solvent, the resulting rubber hydrochloride becomes supersaturated with the ester so the ester blooms to the surface. The hydrophobic rubber hydrochloride thus becomes covered with a thin film of the hydrophilic ester of uniform thickness, and the thinness and uniformity of the film can be much more easily regulated than by attempting to apply a coating solution to the surface of the finished film. It is important to use the minimum amount of ester which will give effective results because too thick a coating is apt to make the surface of the film tacky and interfere with the opening of a preformed bag for filling, and likewise it is apt to interfere with the heat-sealing of the bag after it is filled.

To illustrate the preparation of a satisfactory film it is proposed to add from one to ten per cent and preferably three per cent of tetraethylene glycol dioleate (based on the weight of rubber hydrochloride) to a solution of 100 parts by weight of rubber hydrochloride dissolved in benzene. The solution is cast onto a smooth surface and the solvent evaporated with circulation of air and heating to below the boiling point of the solvent. The solution is cast so thin that after evaporation of the solvent the rubber hydrochloride film is about .001 inch thick. Films of different thickness may be produced. For thinner films a higher percentage of non-fogging agent is required than for thicker films. Commercial films are of a thickness of .0008 to .002 inch.

What I claim is:

1. The method of producing a non-fogging film of rubber hydrochloride which comprises adding one to ten per cent (based on the weight of the rubber hydrochloride) of a polyethylene glycol ester of an aliphatic acid of twelve to twenty carbon atoms to a solution of rubber hydrochloride in benzene, the polyethylene glycol having a molecular weight of 400 to 4000 and being used in an amount in excess of that which will dissolve in the final film product, casting the solution as a film and evaporating the benzene to produce film which is substantially .0008 to .002 inch thick, whereby the ester forms a bloom on the surface of the film product.

2. The method of producing a non-fogging film of rubber hydrochloride which comprises adding three per cent (based on the weight of the rubber hydrochloride) of tetraethylene glycol dioleate to a solution of rubber hydrochloride in benzene, the dioleate being used in excess of that which will dissolve in the final film product, casting the solution as a film and evaporating the benzene to produce film substantially .001 inch thick, and whereby the dioleate forms a bloom on the surface of the finished film.

3. The method of producing a non-fogging film of rubber hydrochloride which comprises adding one to ten per cent (based on the weight of the rubber hydrochloride) of polyethylene glycol dilaurate to a solution of rubber hydrochloride in benzene, the polyethylene glycol having a molecular weight of 1500 and being used in excess of the amount which will dissolve in the final film product, casting the solution as a film and evaporating the benzene to produce film which is substantially .0008 to .002 inch thick, whereby the ester forms a bloom on the surface of the film product.

4. Rubber hydrochloride film having thereon a bloomed surface coating of polyethylene glycol ester of fatty acid.

5. Rubber hydrochloride film having thereon a bloomed surface coating of polyethylene glycol ester of an aliphatic acid of 12 to 20 carbon atoms, the polyethylene glycol having a molecular weight of 400 to 4000.

6. Rubber hydrochloride film having thereon a bloomed surface coating of polyethylene glycol dilaurate, the polyethylene glycol having a molecular weight of 1500.

CLARENCE M. CARSON.

REFERENCES CITED

The following references are of record in the file of this patent:

UNITED STATES PATENTS

| Number | Name | Date |
|---|---|---|
| 2,136,499 | Gloor | Nov. 15, 1938 |
| 2,308,186 | Lyon | Jan. 12, 1943 |
| 2,343,834 | Scott | Mar. 7, 1944 |
| 2,349,036 | Ferner | May 16, 1944 |